Oct. 25, 1955  E. C. ELSNER  2,721,668
COMPACT MATERIAL HANDLING TRUCK DEVICE
Filed Dec. 13, 1952  2 Sheets-Sheet 2
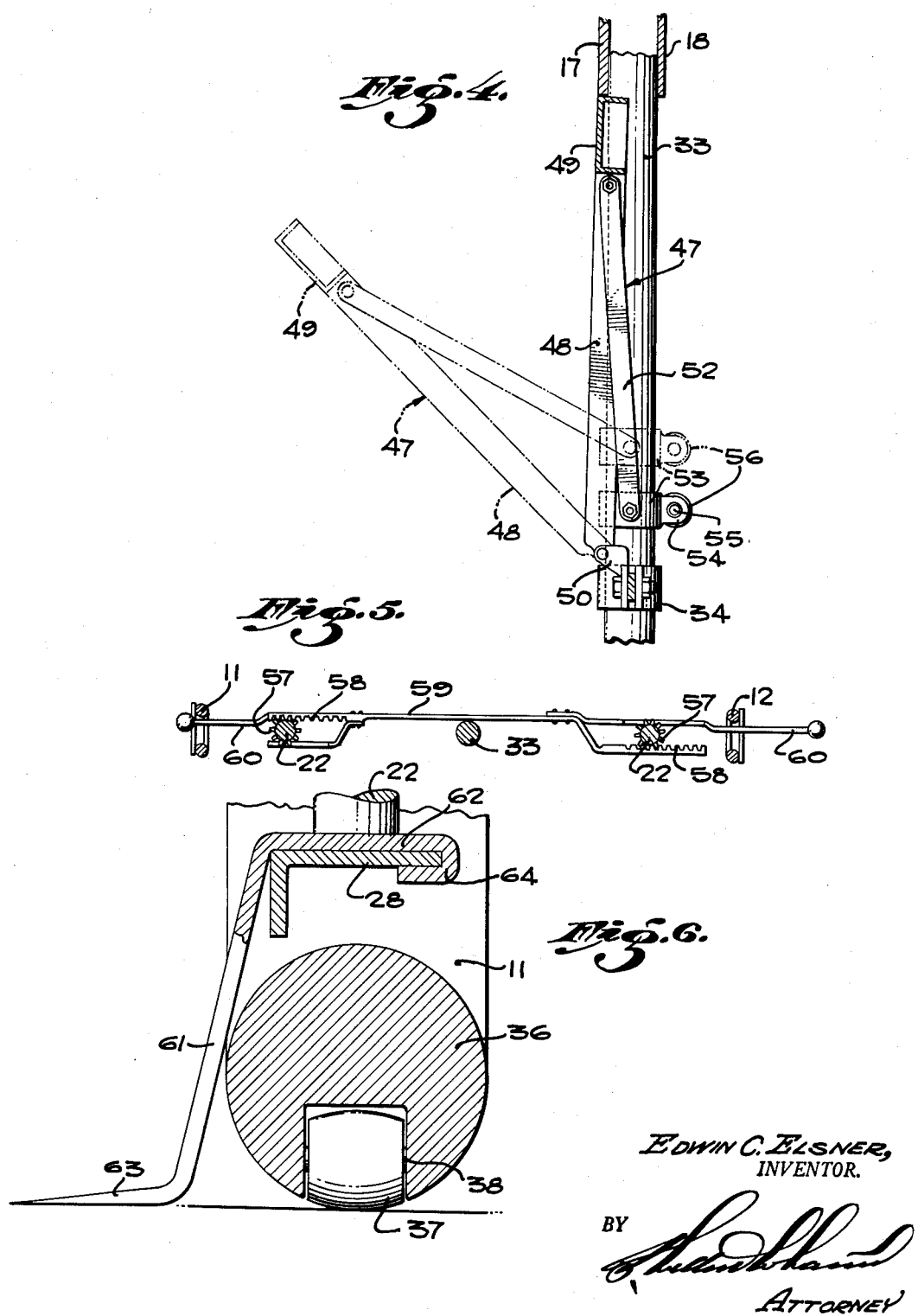
Edwin C. Elsner,
INVENTOR.
BY
Attorney

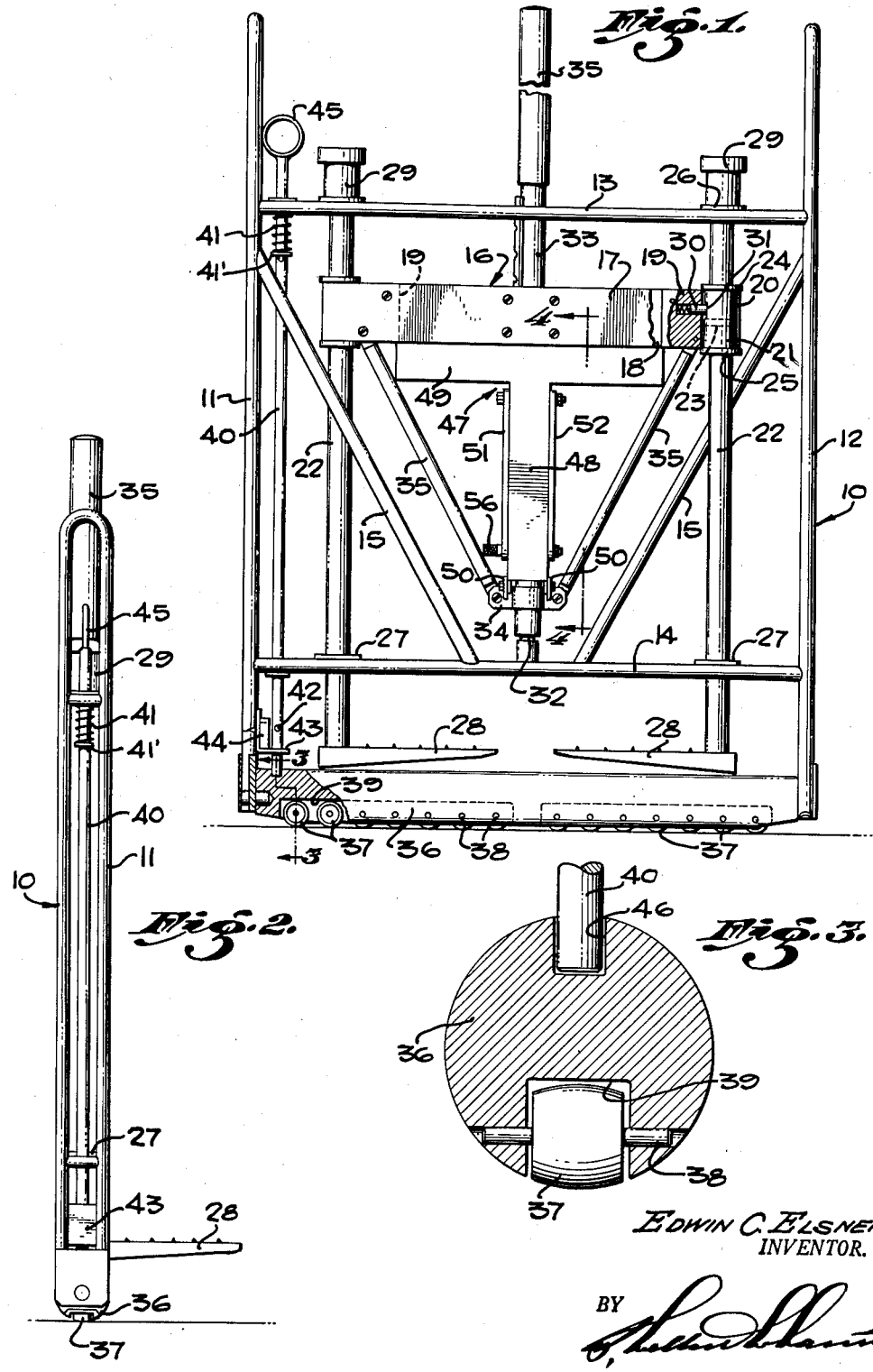

United States Patent Office 2,721,668
Patented Oct. 25, 1955

2,721,668

COMPACT MATERIAL HANDLING TRUCK DEVICE

Edwin C. Elsner, Glendale, Calif.

Application December 13, 1952, Serial No. 325,836

11 Claims. (Cl. 214—731)

The present invention relates generally to a material handling device, and is more particularly concerned with devices of the type for the engaging and moving of palletized and unpalletized objects or cargoes in restricted areas. The invention is especially useful in the handling of cargo in aircraft.

In aircraft, ships and other places where cargo and storage spaces are at a premium, conventional types of cargo and material handling equipment are unsuited. In the main, such equipment is extremely bulky and so large that it is impossible to compactly store or place the cargo or other objects, and conversely when such material is placed with a minimum of intervening space, the intervening space is too small to admit use of conventional equipment to remove the material efficiently and easily.

Another prime consideration is the movement of heavy loads over the comparatively delicate decks or floors of the aircraft. Conventional caster mounted equipment is not adapted for such purpose, whereas in the present invention novel means are provided for distributing the load over a large area which thus prevents damage to the deck or flooring.

Recognizing the inadequacy of conventional material handling devices under said circumstances, the present invention in its broad aspects has for one object the provision of a material handling device in which the component parts are of such a nature that they may be compactly assembled into a very narrow frame structure having a thickness in the order of a few inches, and in which fingers or other suitable means are provided for movement to extended and non-extended positions in such a way that the frame may be inserted into a very narrow space and the fingers moved, for example, under a supporting pallet. Moreover the frame structure is supported on novel rollers for movement in different directions, and power means are provided for raising the fingers to elevate the cargo.

A further object is to provide in a material handling device a unique compound roller assembly which enables movement of the device in a multitude of directions.

A still further object is to provide in a device of the character described, adjustable means for abutting engagement with the object to be handled, such means being so arranged that it will abut an upper portion of the material and act to hold the frame structure of the device in an upright position during use.

Another object is to provide a material handling device having a plurality of fingers adapted to be associated with the material to be handled, wherein novel means are provided for actuating the fingers in unison to extended and retracted positions.

It is also an object to provide an auxiliary attachment which may be utilized with the fingers of the material handling device, so as to adapt the device for utilization with material other than palletized, and which will permit association with the material at the surface upon which it is supported.

With the foregoing in mind, the invention briefly comprises a frame structure of relatively narrow thickness, which is arranged at its lowermost end with a compound roller consisting of an elongate roller arranged for lateral movements of the supporting frame structure, but equipped with supplementary rollers which are laterally aligned along the surface of the main roller in such a way that in one position of the main roller, the supplementary rollers permit edgewise movement of the frame structure.

Associated with the main frame structure is a second frame structure which includes a plurality of rotatable fingers which may be selectively positioned so as to lie within the confines of the main frame, but may be rotated so as to project outwardly therefrom under a pallet of standard construction. Power amplifying means are provided, whereby manual manipulation may be utilized for raising relatively heavy materials with which the device may be associated. Such power means may take various forms, and may embody a hydraulic cylinder arrangement.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is a front elevational view of a material handling device embodying the features of the present invention;

Fig. 2 is a side elevational view of the same, showing the fingers extended for association with the material to be handled;

Fig. 3 is a transverse sectional view, taken substantially on line 3—3 of Fig. 1, showing details of construction of the main roller and locking means therefor;

Fig. 4 is a fragmentary enlarged view, showing details of the material engaging bracket, as it appears from line 4—4 of Fig. 1;

Fig. 5 is a view more or less schematically illustrating a modification of the device; and Fig. 6 is a view diagrammatically illustrating a further modification of the device.

Referring generally now to the drawings, for illustrative purposes, the material handling device of the present invention is shown as comprising a generally rectangular frame structure 10, which may assume various forms. To the end that the frame will embody a high degree of strength, and yet be of sufficient lightness to permit its being manually carried, the frame is in this instance of skeletal construction, and for the most part is fabricated from tubular material.

The frame generally comprises relatively narrow side rails 11 and 12 which are interconnected by an upper cross rail 13 adjacent their upper ends, and a lower cross rail 14 adjacent their lower ends. If desired, the side rails may be braced with respect to the lower cross rail by angularly positioned bracing members 15, respectively.

Supported within the boundary confines of the frame structure 10 is a second frame structure 16 which is of suitable fabricated members arranged to be raised and lowered within predefined limits.

More specifically, in the illustrated embodiment of the invention, the frame structure 16 is shown as comprising in this case a pair of rail members 17 and 18 secured in parallel relation and spaced apart by spacing blocks 19 adjacent the respective ends of the assembled rail members.

As shown in Fig. 1, the rail members 17 and 18, at each end are supported by a bushing 20 having a tubular sleeve body 21 which is secured to a guide rod 22 by a pin 23. End flanges 24 and 25 respectively extend over the associated upper and lower edges of the rail members so as to retain the guide rod against endwise movements, but enable rotational movement thereof with respect to the ends of the associated rail members 17 and 18.

At its upper end, the rod 22 is supported for movement in an apertured plate 26 supported on the upper cross rail 13, and at its lower end is movably supported in an apertured plate 27 mounted on the lower cross rail 14. A finger member 28 is secured at one end to the lower end of rod 22, this finger projecting at right angles to the rod and being movable with the rod. At the upper end of the rod, above the plate 26, the rod has secured thereto a knob 29 which may be utilized to manually rotate the rod 22 so as to position the finger 28, as shown in Fig. 1, so that it projects inwardly from the adjacent side rail of the frame structure 10 in parallel with the lower cross rail 14, or the rod 22 may be rotated to carry the finger to an outwardly extended or projecting position beyond the frame structure 10, as shown in Fig. 2, which is a use position of the finger. A similarly mounted rod 22 and finger 28 arrangement is provided at the other side of the frame structure 16, adjacent side rail 11.

In order to prevent the fingers 28 from inadvertently swinging to their extended position of use, and to retain the fingers within the confines of frame structure 10 in a position as shown in Fig. 1, releasable detent means are provided. Different arrangements may be utilized for this purpose, however, in the present instances the detent is shown as comprising a spring biased detent pin 30 which is reciprocably mounted in the block 19 with its outer end bearing against the adjacent sleeve body 21. A flattened surface 31 on the sleeve body provides a dwell point for this position of the finger 28.

Various types of power devices by which manually applied power may be multiplied, may be utilized for raising and lowering of the frame structure 16 and associated fingers 28. In the disclosed arrangement, hydraulic cylinder means have been utilized, such means comprising an upstanding piston member 32 which is supported at the center of the lower cross rail 14. This piston member is associated with a tubular cylinder member 33 which is anchored to the rail members 17 and 18, and braced at its lower end by being connected with a clampingly secured fitting 34 which is connected on opposite sides with the lower ends of bracing members 35, these bracing members being respectively secured at their upper ends to the rail members 17 and 18 and associated blocks 19. The cylinder 33 at its upper end, which extends above the upper cross rail 13, is connected with a manually operable reciprocably mounted member 35 which constitutes the pump means of the hydraulic mechanism by which the frame structure and associated fingers 28 may be raised and lowered.

Below the lower cross rail 14, there is positioned an elongate generally cylindrical main roller 36, this roller being pivotally mounted for rotation by suitable pivots respectively associated with side rails 11 and 12. As shown in Fig. 2, the diameter of the main roller 36 is such that its periphery will not project beyond the edge margins of the side rails. This main roller permits movement of the device in planes of movement at right angles to the longitudinal axis of the roller.

As shown in Fig. 3, a plurality of supplementary rollers 37 are laterally aligned between the ends of the main roller 36, each of the supplementary rollers being mounted for rotational movement upon an axle pin 38 which extends at right angles to the longitudinal center line of the main roller. It will be noted that the outer surface of the supplementary rollers is curved between its ends to conform to the circumference of the main roller 36 so as to permit unimpeded rotation of the main roller about its axis. However, it will be appreciated that with the supplementary rollers positioned as shown in Fig. 3 with their surfaces in engagement with a supporting surface, the device may be moved edgewise in planes of movements parallel to the longitudinal axis of the main roller. The roller construction just described provides a unique compound roller assemblage which permits selective movements of the device in planes of movement in right angle relation to each other and greatly facilitates the utilization of the device in confined spaces. The roller assembly may be constructed in various ways to obtain the desired result as explained above. In the present instance the roller has been shown as of solid construction and has been provided with a longitudinally extending surface groove 39 within which the aligned supplementary rollers 37 are positioned.

Provision is made for enabling free rotational movement of the main roller 36, or it may be releasingly latched in a position in which the supplementary rollers 37 are to be utilized. In the present instance, the latching mechanism comprises a rod 40 which is supported adjacent the inner face of side rail 11, this rod being reciprocably supported at its upper end in the upper cross rail 13 and at its lower end in the lower cross rail 14. An expansion coil spring 41 surrounds the rod 40 adjacent its upper end, one end of this spring bearing against the associated portion of the upper cross rail 13, and the other end bearing against a washer 41' affixed to the rod. This spring acts to bias the rod 40 in a downward direction, this movement being limited by a pin 42 engaging with the leg of an angle bracket 43 which is secured to the lower cross rail. A block 44 is mounted adjacent the portion of the rod containing the pin 42, the upper end of this block providing a raised surface upon which the pin 42 may be seated by pulling the rod upwardly and rotating it substantially 90°. A digitally engageable ring 45 is arranged at the upper end of the rod 40 to facilitate its manipulation. As shown in Fig. 3, the lower end of the rod 40 is adapted to extend into, in its lowered position, a recess 46 in the main roller, and in this position acts to secure the roller against rotation and retain it in such position that the supplementary rollers 37 are in their position of use.

The material handling device as thus far described is primarily adapted for utilization with palletized cargoes or objects which extend substantially to the opposite edges of the pallet. It is believed that it will be readily apparent from the previous description that the device may be readily moved into a confined space by utilizing the supplementary rollers 37 in an edgewise direction so as to position the frame structure in confronting relation against one side of the palletized cargo or load.

With the frame structure 16 and the associated fingers 28 at their lowered position, the fingers 28 may be readily actuated by turning the knobs 29 so as to move them to extended position under the raised platform surface of the conventionally standard pallet. It is then a simple operation to raise the associated pallet end by actuating the power means, in this case by reciprocably actuating the pumping member 35. It will be observed that the downward pressure of the pallet load on the fingers 28 acts to force the uppermost portion of the frame structures in a direction against the pallet load. By a similar operation, another material handling device may be placed under the opposite end of the pallet, and while the action of the forces act to hold the frame structures of the devices in an upright position, it may be desirable to utilize flexible straps for holding the devices in position.

With the handling devices of the present invention secured to a palletized load as described above, it is believed that it will be apparent that the movement of the load and control of the movement direction may be efficiently and flexibly accomplished. For example, with the main rollers 36 released for rotation, the palletized load may be readily moved in opposite directions towards the associated handling devices, or by locking both main rollers in the position in which the supplementary rollers 37 are exposed for use, the palletized load may be moved in the direction at right angles to the previous direction. Moreover angular swinging movement of the palletized load may be accomplished by having the main roller of one of the devices released for rotation and the main roller of the other device locked with the supplementary rollers 37 in a position of use. This enables a compound angular movement of one of the devices about the other device which serves as an anchor.

In some cases, the load which may be mounted on the pallet does not extend to the pallet edges so as to normally provide an abutment against which the upper portions of the frame structures may abut and be held in upright position. Provision is made for use of the device under such conditions. As shown in Figs. 1 and 4, a T-shaped bracket 47 is provided, this bracket comprising a main leg 48 and an integrally formed or connected cross leg 49. The bracket is pivoted for swinging movement by pivotally mounting the lower end of main leg 48 between a pair of spaced supporting lugs 50—50 formed on the fitting 34. Adjacent the upper end of the main leg 48, connecting links 51 and 52 are pivotally connected at their upper ends on opposite sides of the main leg 48. At their lowermost ends, the links 51 and 52 are pivotally connected to a slidable clamping ring 53 supported for sliding movement on the cylinder member 33. The clamping ring has spaced lugs 54 (one only shown) which are operatively associated with a clamping screw 55 having a digitally engageable actuating head 56.

The bracket 47 is movable to an inactive position, as shown in full lines in Fig. 4, but when desired may be moved to a projecting angularly inclined position as shown in dotted lines, wherein it extends beyond the frame structure 10 of the device. The bracket 47 may be retained in adjusted position by tightening the clamping screw 55 to secure the clamping ring 53 at the adjusted position on the cylinder 33. In practice, the bracket 47 would be moved to a position wherein it will abut the adjacent surface of the palletized load, so as to retain the device frame structures in an upright position, when utilized with loads which do not extend to the associated pallet edges.

Referring now to Fig. 5, there is more or less schematically disclosed a modification which may be embodied in the present invention. In this modification, the guide rods 22—22 are interconnected for unitary rotational movement. For this purpose, the rods are respectively fitted with pinions 57, these pinions being respectively associated with toothed racks 58 carried by a connecting bar 59 which is supported for reciprocable endwise movements. At the opposite ends of the bar structure 59, end extensions are formed which project beyond the side rails 11 and 12, respectively, to provide push-pull members 60 by which the guide rods 22 may be simultaneously rotated in order to move the fingers 28 to extended or retracted positions, when desired.

A further modification is shown in Fig. 6 which permits the material handling device to be utilized with objects which are not supported on conventional pallets, but which rest upon a supporting surface. In this case, an auxiliary plate member is provided which has angularly deflected side margins 62 and 63. The margin 62 is bent back along one edge, as indicated by the numeral 64, so that it may be hooked over the edges of the fingers 28, when in retracted position as shown in Fig. 1, and thus serve to support the plate member with its side margin 63 projecting beyond the confines of the upright frame structure of the device and to form a lip at floor surface level which may be pushed under a floor supported object and thus enable its being raised to a supported position on the material handling device. When not in use, the plate member 61 may be removed and the device utilized for the handling of palletized objects or loads.

Various modifications may suggest themselves to those skilled in the art without departing from the spirit of my invention, and, hence, I do not wish to be restricted to the specific form shown or uses mentioned, except to the extent indicated in the appended claims.

I claim:

1. A material handling device, comprising: a frame structure adapted for association with an object to be carried thereby; a main roller supporting said frame for one plane of movements; a plurality of supplementary rollers carried by said main roller and supported in alignment longitudinally of the main roller with their surfaces exposed, in one position of the main roller, to support said frame for a plane of movements at an angle to said first plane of movements; and means for locking said main roller in said one position.

2. A material handling device, comprising: a frame structure adapted for association with an object to be carried thereby; a main roller supporting said frame for one plane of movements; and a plurality of supplementary rollers carried by said main roller and supported in alignment longitudinally of the main roller with their surfaces exposed, in one position of the main roller, to support said frame for a plane of movements at an angle to said first plane of movements.

3. A hand truck: comprising a frame adapted for association with an object to be carried thereby; a main roller at one end of the frame to support said frame for movements in one plane; a supplementary roller adjacent said main roller to support said frame for movements in a plane transverse to said one plane, and means to move both rollers simultaneously to selectively position said rollers in frame-supporting position to move the truck in one of said planes, selectively.

4. A hand truck according to claim 3: means to lock the main roller when the supplementary roller is in truck-supporting position.

5. A material handling device, comprising: a frame structure of relatively narrow thickness, and having spaced side rails; means supported for raising and lowering movements between said side rails adapted for association with an object to be handled; an elongate main roller extending generally between the lower ends of said side rails and pivoted at its ends for rotational movements; a plurality of aligned supplementary rollers supported on the main roller for rotation in a plane at right angles to a plane of rotation of said main roller, said supplementary rollers having end-to-end surfaces presenting lines of contact which conform with the transverse surface curvature of the main roller; and means for locking said main roller in a position with the supplementary rollers exposed for use.

6. A material handling device, comprising: a frame structure of relatively narrow thickness, and having spaced side rails; means supported for raising and lowering movements between said side rails adapted for association with an object to be handled; an elongate main roller extending generally between the lower ends of said side rails and pivoted at its ends for rotational movement, and a plurality of aligned supplementary rollers supported on the main roller for rotation in a plane at right angles to a plane of rotation of said main roller, said supplementary rollers having end-to-end surfaces presenting lines of contact which conform with the transverse surface curvature of the main roller.

7. A material handling device, comprising: a frame structure of relatively narrow thickness, and having spaced side rails; means supported for raising and lowering movements between said side rails adapted for association with an object to be handled; an elongate main roller extending generally between the lower ends of said side rails and pivoted at its ends for rotational movement, and a plurality of supplementary rollers carried by said main roller between its ends, and having surfaces of curvature conforming with the surface curvature of said main roller, said supplementary rollers being supported for rotation about axes having 90° relation with the axis of the main roller so as to enable movement of the frame in an edgewise direction.

8. A material handling device, comprising: a relatively flat frame structure presenting a large front area, said frame being adapted to be placed in an upright position with said front area adjacent to and facing an object to be handled; a support mounted in said frame for raising and lowering movements; a projecting finger carried by said support adjacent the bottom of said frame structure for engaging said object adjacent a bottom portion thereof; a bracket member carried by said support positioned above said finger; means pivotally connecting said bracket adjacent its lower end for adjustable swinging movements to a position parallel with said front area and positions angularly projecting beyond said front area, said bracket in a projecting position being adapted to abut said object; means for releasably securing said bracket in an adjusted position; and means operable to raise and lower said support.

9. A material handling device, comprising: a relatively flat frame structure presenting a large front area, said frame being adapted to be placed in an upright position with said front area adjacent to and facing an object to be handled; a projecting finger adjacent the bottom of said frame structure for engaging said object adjacent a bottom portion thereof; a member positioned above said finger, said member being adjustable to abut said object at a position outwardly spaced from said front face; means mounting said finger and member for unitary raising and lowering movement, with said member acting to hold said frame in an upright position; and means operable to raise and lower said finger and member.

10. A material handling device, comprising: a frame structure of relatively narrow thickness and having spaced side rails; a pair of spaced fingers supported on said frame for unitary raising and lowering movement, and for swinging movements to positions extending beyond said frame and positions within the confines of said frame; a rack and pinion connection between said fingers connecting the same for unitary swinging movement; and push-pull members for manually actuating said connection, said members respectively extending beyond said side rails.

11. A material handling device, comprising: a frame structure of relatively narrow thickness, a pair of spaced fingers supported on said frame for unitary raising and lowering movement, and for swinging movements to positions extending beyond said frame and positions within the confines of said frame; a member removably engageable with said fingers in said latter positions, said member having a projecting lip extending beyond said frame structure; and means for raising and lowering said fingers and member as a unit.

References Cited in the file of this patent

UNITED STATES PATENTS

| | | |
|---|---|---|
| 740,267 | Gamble | Sept. 29, 1903 |
| 962,308 | Burnett | June 21, 1910 |
| 1,928,305 | Blakesley | Sept. 26, 1933 |
| 2,415,655 | Reinert | Feb. 11, 1947 |
| 2,635,771 | Black | Apr. 21, 1953 |
| 2,643,784 | Turner et al. | June 30, 1953 |

FOREIGN PATENTS

| | | |
|---|---|---|
| 565,138 | Great Britain | Apr. 14, 1944 |
| 475,792 | Canada | Aug. 7, 1951 |